United States Patent
Halluin et al.

(10) Patent No.: US 6,606,367 B2
(45) Date of Patent: Aug. 12, 2003

(54) DEVICE FOR MEASURING THE DROP TIME OF CONTROL RODS INTO THE CORE OF A NUCLEAR REACTOR

(75) Inventors: Hervé Halluin, Arras (FR); Philippe Paris, Concorde (FR)

(73) Assignee: Framatome ANP, Courbevoie (FR)

( * ) Notice: Subject to any disclaimer, the term of this patent is extended or adjusted under 35 U.S.C. 154(b) by 0 days.

(21) Appl. No.: 09/790,649

(22) Filed: Feb. 23, 2001

(65) Prior Publication Data

US 2001/0031030 A1 Oct. 18, 2001

(30) Foreign Application Priority Data

Apr. 14, 2000 (FR) .............................. 00 04868

(51) Int. Cl.⁷ .............................................. G21C 17/00
(52) U.S. Cl. ........................ 376/245; 376/258; 376/259
(58) Field of Search ................................ 376/215, 240, 376/245, 258, 259

(56) References Cited

U.S. PATENT DOCUMENTS

| | | | | |
|---|---|---|---|---|
| 4,155,116 A | * | 5/1979 | Tawfik et al. ................. | 700/81 |
| 4,314,881 A | * | 2/1982 | Wu ............................ | 376/245 |
| 4,668,465 A | * | 5/1987 | Boomgaard et al. ......... | 376/216 |
| 4,896,101 A | * | 1/1990 | Cobb ........................ | 324/73.1 |
| 5,006,301 A | | 4/1991 | Lexa ......................... | 376/259 |
| 5,076,996 A | * | 12/1991 | Miyaguchi et al. ......... | 376/240 |
| 5,329,465 A | * | 7/1994 | Arcella et al. .............. | 702/184 |
| 5,999,583 A | * | 12/1999 | Pysnik et al. ............... | 376/228 |
| 6,118,837 A | * | 9/2000 | Krien et al. ................ | 376/258 |
| 6,404,835 B1 | * | 6/2002 | Morton et al. .............. | 376/245 |

FOREIGN PATENT DOCUMENTS

| | | |
|---|---|---|
| DE | 250 201 | 9/1987 |
| FR | 2770329 | 4/1999 |
| WO | WO 98/52196 | 11/1998 |

OTHER PUBLICATIONS

Hashemian, H. M, and Fain, R. E., "Experience With Measurement of Drop Time for Control and Shutdown Rods and Testing of CRDMs in Nuclear Power Plants," pp. 259–271, 1995.*

Fain, R. E., Petersen, K.M., and Hashemian, H. M, "New Equipment for Rod Drop and Control Rod Drive Mechanism Timing Test in PWRs," pp. 371–381, 1995.*

Westinghouse Electric Corporation Descriptive Bulletin Nuclear I&C No. DB21N–504 "Automatic Multiple Rod Drop Test System," 1993.*

Analysis and Measurement Services Corporation Technical Bulletin No. RD9401 "Rod Drop and CRDM Timing Tests in PWRs," 1994.*

* cited by examiner

Primary Examiner—Peter M. Poon
Assistant Examiner—Daniel Matz
(74) Attorney, Agent, or Firm—Connolly Bove Lodge & Hutz LLP

(57) ABSTRACT

The measurement device comprises a real-time measurement-signal acquisition module (25) and means (23, 24) for connecting the cables for picking up the voltage from electrical windings for measuring the movement of the control rods to the acquisition module (25), in order to deliver, to the acquisition module (25), voltage signals corresponding to the voltage induced in the windings while the control rods are being dropped. The signal acquisition module (25) is thus permanently connected to the voltage-signal pickup cables (29) and the signals relating to the set of nuclear reactor control rods may be recorded simultaneously. Means (26, 27) for using the voltage signals delivered by the acquisition system (25) allow the drop times of the control rods to be determined.

9 Claims, 7 Drawing Sheets

US 6,606,367 B2

DEVICE FOR MEASURING THE DROP TIME OF CONTROL RODS INTO THE CORE OF A NUCLEAR REACTOR

FIELD OF THE INVENTION

The invention relates to a device for measuring the drop time of control rods into the core of a nuclear reactor and in particular into the core of a pressurized-water nuclear reactor.

BACKGROUND OF THE INVENTION

Nuclear reactors, such as pressurized-water nuclear reactors, comprise a vessel closed at its upper part by a closure head, containing the reactor core which consists of fuel assemblies, of prismatic overall shape, which are placed in adjacent arrangements, with their axes vertical.

Each of the fuel assemblies comprises a set of vertical guide tubes in each of which a neutron absorber control rod neutron absorber, for controlling the reactivity of the nuclear reactor core, can move.

To adjust the reactivity of the core and to control the nuclear reactor, control rods are used which are moved in a certain number of assemblies distributed over the cross section of the core.

For example, for a nuclear reactor whose core comprises two hundred and five fuel assemblies, seventy-three control rods, which are moved in seventy-three core fuel assemblies, are used.

Each of the control rods comprises a control rod cluster consisting of neutron absorbers which are connected, in mutually parallel arrangements, to a fastening and suspension device called a spider assembly which is connected to a drive shaft made in splined form, so as to move the control rods step by step over the height of the nuclear reactor core, in order to adjust the reactivity.

The control rods are moved over the height of the core by mechanisms which are fastened to vertical tubular enclosures placed above the vessel closure head. The drive shafts, which are moved in a coaxial arrangement inside the tubular enclosures, engage via their splines with latch arms of the mechanisms allowing the control rod to be moved.

The nuclear reactor control rods also have a safety function, since they must allow emergency shutdowns of the nuclear reactor to take place, by the control rods dropping back into the position of maximum insertion in the nuclear reactor core.

To do this, the control rod mechanism releases the drive shaft so that the rod and the drive shaft can drop back into the nuclear reactor core under the effect of gravity.

In order to check the effectiveness of the nuclear reactor emergency shutdown device, it is necessary to determine and check the drop time of the control rods into the nuclear reactor core, this measurement and checking operation having to be carried out periodically, for example after the nuclear reactor has been shut down for refuelling and maintenance, before restarting the nuclear reactor.

To measure the drop time of the control rods of a nuclear reactor, the instrumentation for measuring the position of the control rods is used, which instrumentation in particular comprises measurement windings surrounding each of the tubular enclosures placed vertically above the vessel closure head, to which enclosures are fastened the mechanisms for moving the control rod clusters via the drive shaft which is mounted so as to move inside the tubular enclosure. The windings for measuring the positions of the control rods comprise a primary winding placed approximately over the entire axial length of the tubular enclosure and a plurality of secondary windings spaced apart in the axial direction of the tubular enclosure. The presence or absence of the drive shaft in a region of the tubular enclosure within a secondary winding results in different values of the voltage induced in the secondary winding by the primary winding.

It is thus possible to determine the position of the drive shaft inside the tubular enclosure and, from this position, to determine the position of the control rod cluster inside the nuclear reactor core.

When the control rod clusters drop back down, the movement of the drive shaft in the axial direction inside the tubular enclosure produces an induced voltage in the primary winding, this induced voltage varying according to the rate of movement of the drive shaft and to the length of the section of drive shaft within the primary winding. By recording the voltage induced in the primary winding, during the drop of the control rod from the high position, that is to say from the position in which the control rod cluster is fully extracted, it is possible to determine the drop time of the control rod.

To make the measurements on the various control rods of the nuclear reactor, temporary connections have to be made to each of the cables connecting a device for measuring position of a control rod to a unit for collecting the measurement signals, in order to pick up the voltage at the terminals of the primary winding.

The measurements are carried out in succession on control rod subgroups distributed within the nuclear reactor core.

For example, for a nuclear reactor comprising seventy-three control rods, the measurements are carried out in succession for the subgroups of four control rod which are placed in four parts of the core, called quadrants separated from one another by two planes of symmetry at 90° to each other passing through the axis of the nuclear reactor core. Thus, nineteen successive measurements are carried out in order to determine all the drop times of the seventy-three control rods of the nuclear reactor.

The time needed to carry out the test is therefore quite long, given the fact that it is necessary to make an individual connection to the test device for each of the measurements and to return to the initial operating configuration of the device between two successive measurements.

The drop time measurements are carried out before starting up the nuclear reactor and lie on the critical path for shutting down the nuclear power unit, thereby representing a significant cost because of the increase in the time needed to shut down the nuclear reactor power unit.

In addition, the temporary connection operations create a risk of failure of the connection system on a safety-rated item of equipment.

Hitherto, no measurement device making it possible to carry out the measurement on the set of control rods of the nuclear reactor and to avoid connection operations prior to each of the measurements was known.

BRIEF DESCRIPTION OF THE INVENTION

The object of the invention is therefore to provide a device for measuring the drop time of control rods into the core of a nuclear reactor comprising a vessel closed at its upper part by a closure head and containing the reactor core consisting of fuel assemblies in vertical adjacent arrangements and comprising vertical guide tubes for neutron absorbers of a plurality of control rods each consisting of a neutron absorber rod cluster and a drive shaft connected, at one of its ends, to the control rod cluster, a plurality of tubular enclosures placed vertically above the vessel closure head, each tubular enclosure comprising a mechanism for moving a control rod via its vertical drive shaft which can move in the axial direction of the tubular enclosure and for releasing the control rod in order to ensure that it drops into the position of maximum insertion in the nuclear reactor core, at least one electrical measurement winding surrounding each tubular enclosure, substantially over its entire axial length and connected to a cable for picking up an electrical voltage at the terminals of the winding, the control rods being grouped together in subassemblies and each electrical winding for each of the control rods of a subassembly being connected via its cable to a unit for collecting the measurement signals, this device making it possible to carry out the measurement on all of the control rods of the nuclear reactor at once and without having to carry out a prior operation of connecting the measurement cable.

For this purpose, the measurement device also includes:

a real-time measurement-signal acquisition module;

means for connecting the pick-up cable for each of the electrical measurement windings to the acquisition module in order to receive measurement signals corresponding to the voltage at the terminals of each of the electrical windings; and means for using the voltage signals, which means are connected to the acquisition module in order to measure the drop time of the nuclear reactor control rods.

BRIEF DESCRIPTION OF THE FIGURES

In order to make the invention clearly understood, a device according to the invention for measuring the drop times of control rods of a pressurized-water nuclear reactor, and the use of this measurement device, will now be described by way of example, with reference to the figures appended hereto.

DETAILED DESCRIPTION OF THE INVENTION

Figure 1:
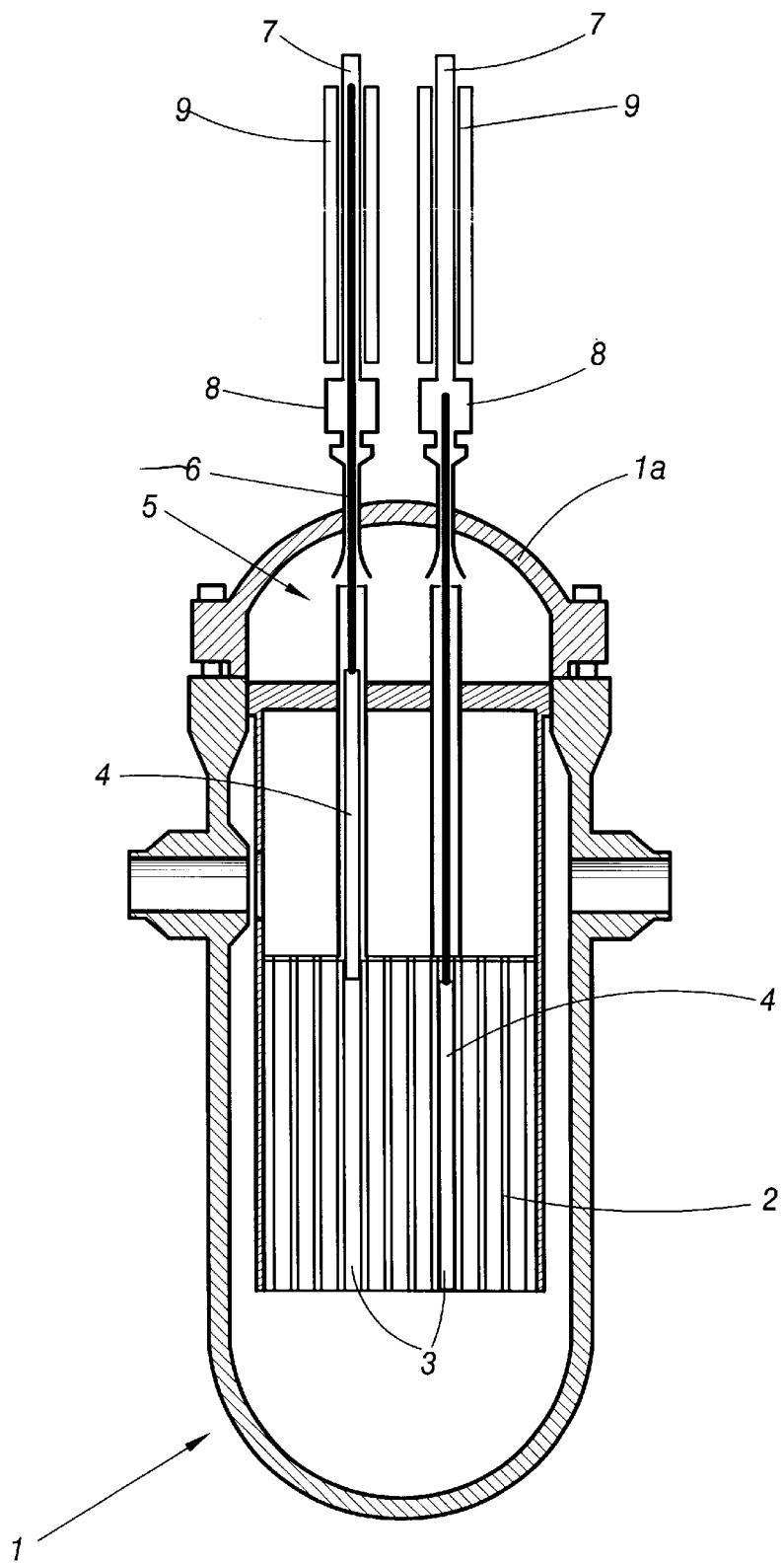
FIG. 1 is a schematic view, in vertical section, of a pressurized-water nuclear reactor vessel and of means for adjusting the reactivity of the nuclear reactor core.

FIG. 1 shows the vessel 1 of a pressurized-water nuclear reactor which contains the reactor core 2 and which is closed in its upper part by a closure head 1a of approximately hemispherical shape.

The nuclear reactor core 2 consists of fuel assemblies which are placed vertically in adjacent arrangement and which comprise means for guiding control rod neutron absorbers which are moved vertically inside the nuclear reactor core 2 in order to adjust the reactivity of the core.

FIG. 1 shows schematically two systems 3 for guiding neutron absorbers of two nuclear reactor core assemblies inside each of which a neutron absorber rod cluster 4 moves, the latter being shown conventionally in the form of a solid unit.

In fact, the neutron absorber rod cluster 4 consists of a number of parallel absorber rods and the guiding system 3 consists of a set of guide tubes for the fuel assembly in which the neutron absorber rod cluster moves, each of the neutron absorbers of the rod cluster being guided inside the fuel assembly by a guide tube.

Each of the neutron absorber rod clusters 4 is connected in its upper part to a drive shaft 6 placed in the axial extension of the rod cluster 4.

The system consisting of the neutron absorber rod cluster and the drive shaft 6 constitutes a control rod 5 for controlling the reactivity in the nuclear reactor core.

FIG. 1 shows one of the neutron absorber rod clusters 4 in the low position, fully inserted into the core, and the second neutron absorber rod cluster 4 in the high position, fully extracted from the core 2.

As will be explained below, the drive shafts 6 are splined shafts, the splining of which defines a toothing over the entire length of the drive shaft.

The drive shafts 6 of the control rods 5 move, between the fully extracted high position of the control rod and the fully inserted low position, inside tubular enclosures 7 which are fastened vertically above the vessel closure head 1a plumb with the rod cluster guide tube and in the upper part of the nuclear reactor vessel.

Each of the tubular enclosures 7 has a mechanism 8 for moving the corresponding control rod 5 via its splined drive shaft 6.

The mechanisms 8 are latch-arm mechanisms which engage with the toothing of the splined drive shaft 6 in order to move the drive shaft step by step inside the tubular enclosure 7 and move the control rod cluster 4 inside the nuclear reactor core 2 in order to adjust the reactivity of the core.

The mechanisms 8 comprise latch arms for movement of the control rods and latch arms for retention of the control rods by means of the drive shafts, the opening of the retention latch arms allowing release of the drive shaft and of the control rod from a high position, the control rod then being able to drop back into the position of maximum insertion in the nuclear reactor core under the effect of gravity.

As indicated above, it is important, before starting up or restarting a nuclear reactor, to determine the drop time of the control rods which constitute safety elements of the nuclear reactor.

Placed around the tubular enclosures 7 for moving the drive shafts 6 of the control rods 5, over a substantial part of the length of the tubular enclosure in the axial direction, above the mechanisms 8, are means 9 for measuring the position of the drive shaft inside the tubular enclosure 7 and therefore the position of the neutron absorber rod cluster of the control rod 5 inside the nuclear reactor core.

Figure 2:
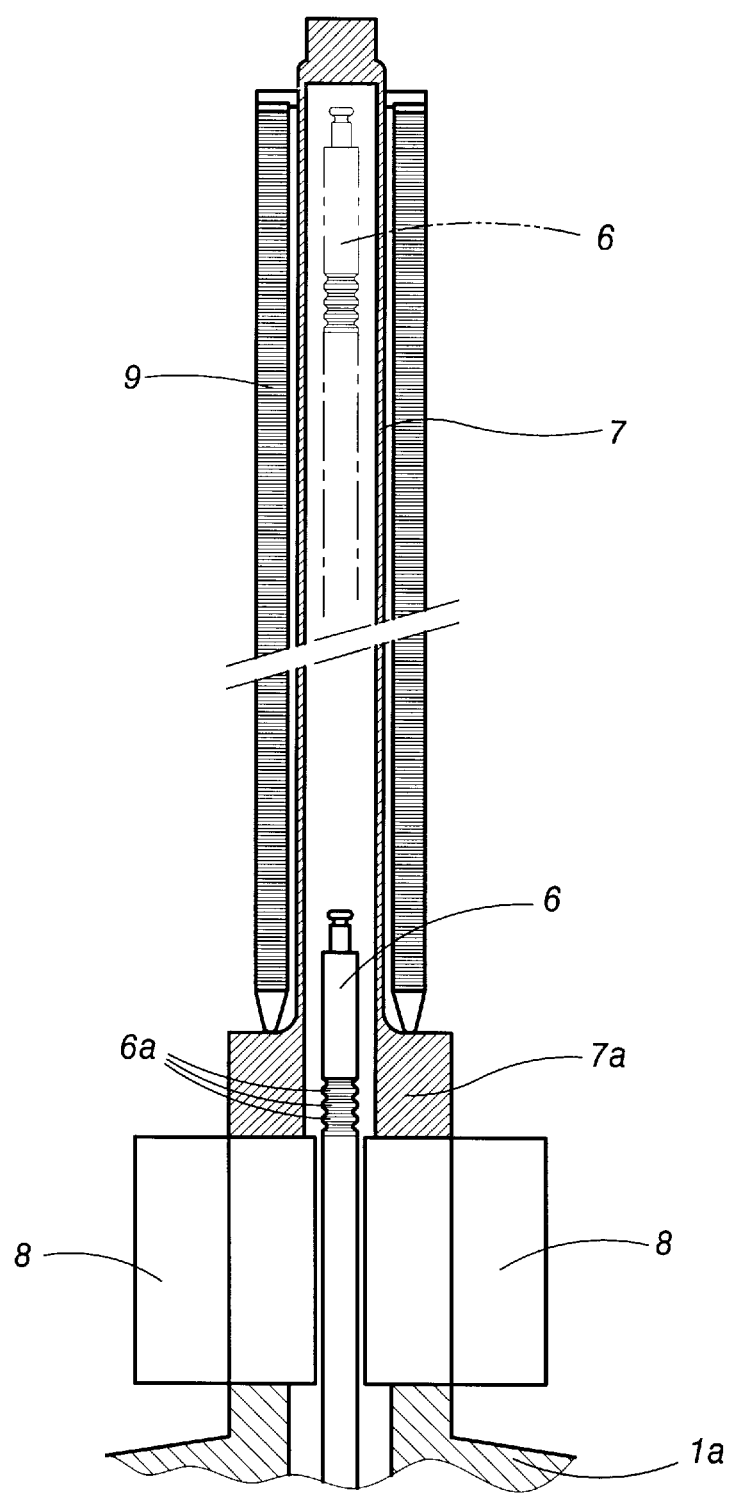
FIG. 2 is a view, in axial section, of a tubular enclosure and of mechanisms for moving a drive shaft inside the tubular enclosure.

FIG. 2 shows a tubular enclosure 7 in which a splined drive shaft 6 moves, a control rod cluster being fastened to its lower end (not shown).

The tubular enclosure 7 is fastened in the axial extension of a tubular element 7a which is fastened to the vessel closure head 1a and ensures penetration of the drive shaft 6, to which closure head the mechanisms 8 for moving the control rod, via the splined shaft 6, are fastened.

The latch arms for retaining and for moving the mechanisms 8 of the control rod engage, inside the tubular parts 7a of the enclosure 7, with the toothing 6a of the splined drive shaft 6.

FIG. 2 shows in solid lines the shaft 6 in its low position corresponding to the position in which the neutron absorber rod cluster is fully inserted into the nuclear reactor core and shows in broken lines the drive shaft 6 in the high position inside the upper part of the tubular enclosure 7.

The upper part of the tubular enclosure 7 allows the drive shaft 6 to move over a length equal to the total height of the core, that is to say over a length of the order of four to five meters.

The device 9 for measuring the position of the control rod is placed around the upper part of the tubular assembly 7 and approximately over the entire length of this upper part, above the mechanisms 8.

Figure 3:
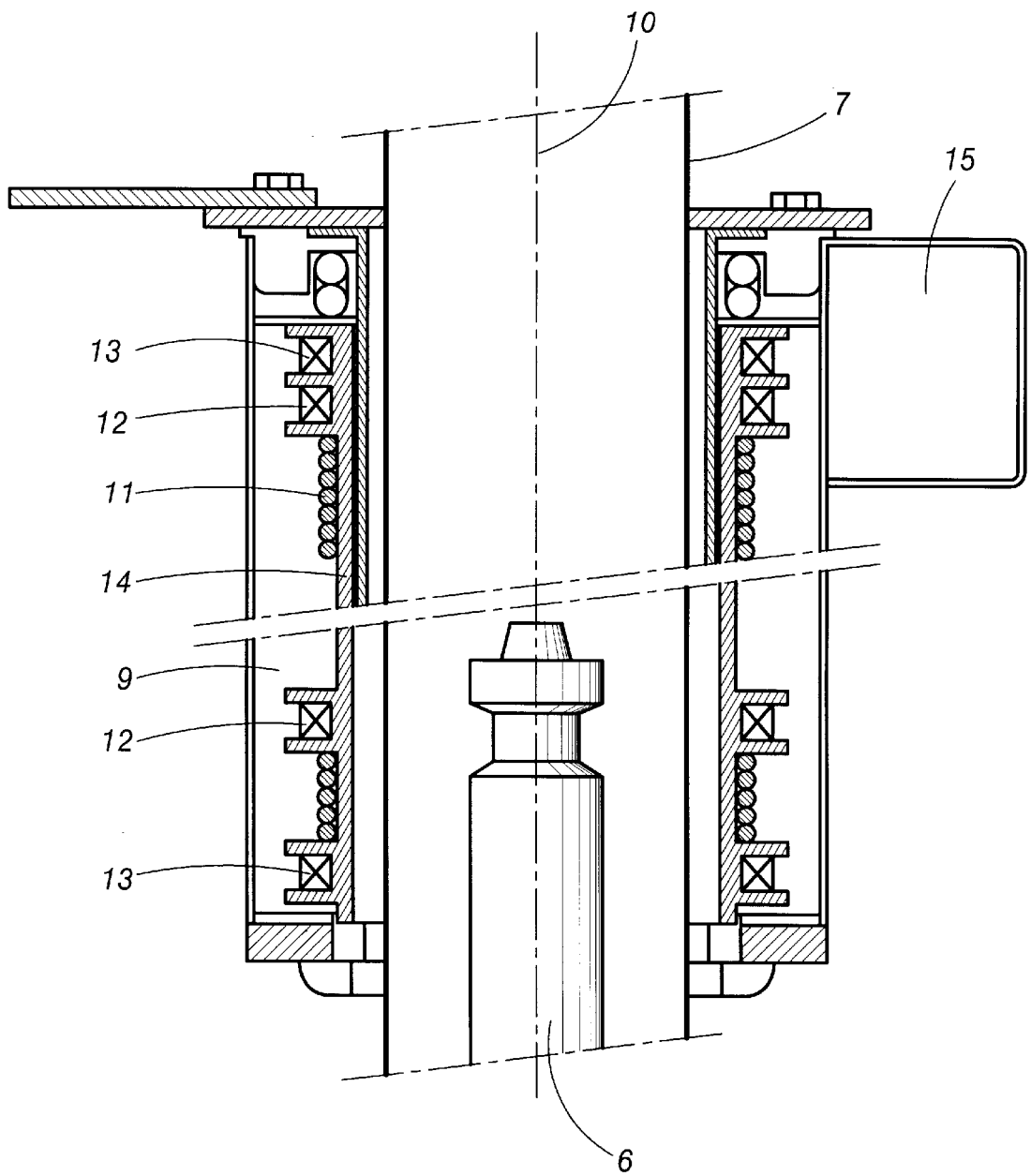
FIG. 3 is an enlarged view, in partial section, of part of the enclosure shown in FIG. 2 and of its windings for measuring the position of a control rod.

As can be seen in FIG. 3, the device 9 for measuring the position of the control rods is placed around the tubular enclosure 7 to which it is fastened by means of upper and lower clamps. The measurement device 9 is placed inside a casing of tubular overall shape bounded by two coaxial cylindrical shells in a coaxial arrangement with respect to the tubular enclosure 7 in which the drive shaft 6 of the control rod moves in the axial direction 10.

The measurement device 9 has the overall form of a differential transformer comprising a primary winding 11 extending approximately over the entire length of the measurement device, that is to say approximately over the entire axial length of the tubular enclosure, and secondary windings 12 distributed in the axial direction 10 of the measurement device, with a constant spacing.

The primary winding 11 and the secondary windings 12 together with auxiliary end windings 13, located at the axial ends of the device 9, are placed in annular cavities of a support 14 placed in a coaxial arrangement with respect to the tubular enclosure 7.

The various windings are connected to supply and measurement lines via a connection box 15.

The primary winding 11 is supplied with AC current at a frequency of 50 Hz, it being possible in addition for the voltage in the winding to be picked up via a pick-up cable connected to the connection device 15.

Each of the secondary windings 12 and of the auxiliary windings 13 is also connected to a cable for picking up the voltage at the terminals of the winding whose connection is provided inside the connection device 15.

Measuring the voltages induced by the primary winding in each of the secondary windings, or in the secondary windings placed in series, makes it possible to determine the position of the drive shaft 6 inside the tubular enclosure 7 and therefore the position of the control rod in the nuclear reactor core, the presence of the drive shaft 6 facing a secondary winding 12 modifying the reluctance of the secondary winding and therefore the coupling between the primary winding and the secondary winding.

In addition, the drop of a control rod from its high position to its low position in the nuclear reactor core results in a movement of the drive shaft 6 inside the enclosure 7 in the axial direction 10, that is to say in the axial direction of the primary winding 11. This results in an induced voltage which, when recorded over time, allows the drop time of the control rod to be determined.

Figure 4:
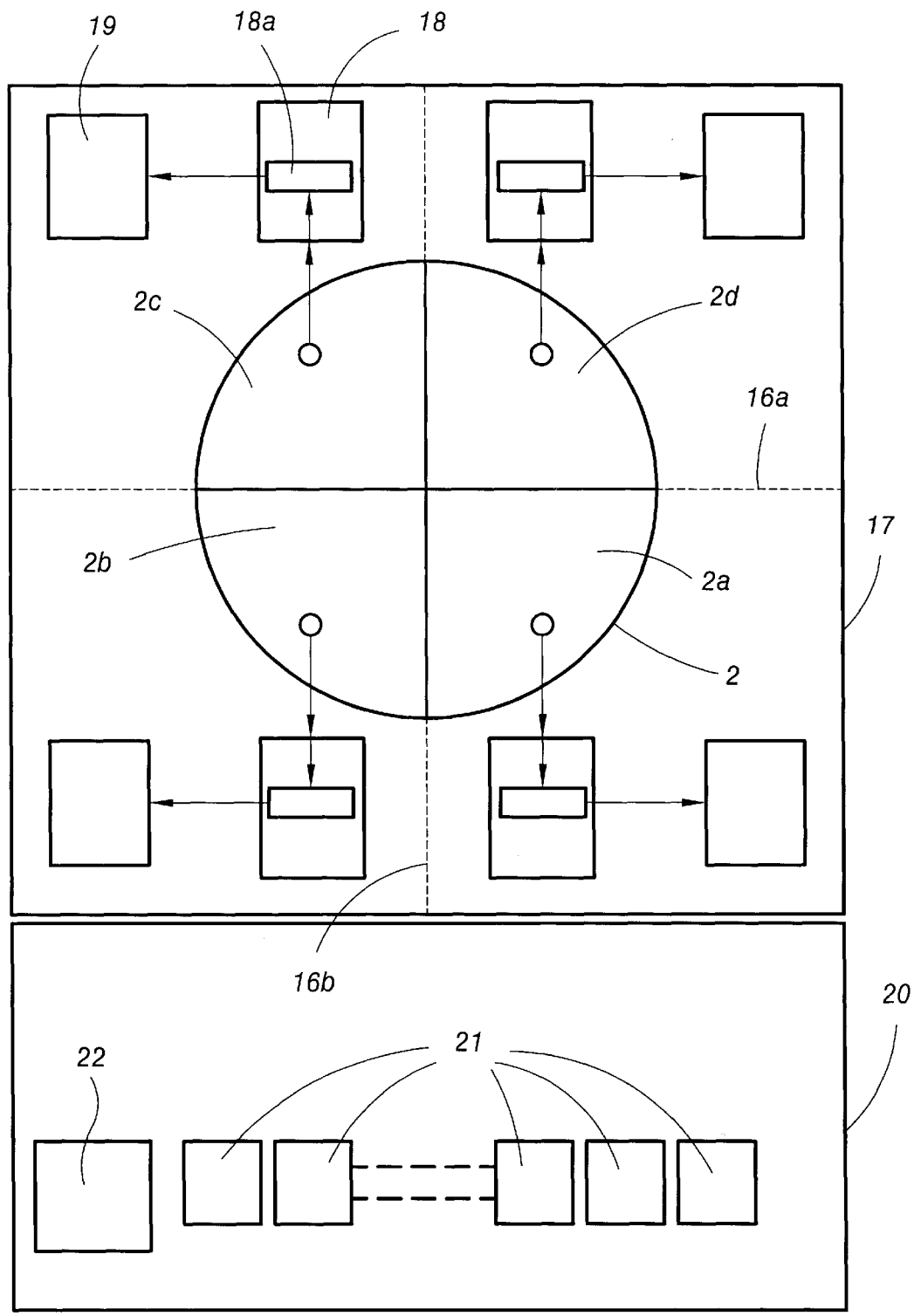
FIG. 4 is a schematic view of a system according to the prior art for processing the measurements of the positions of nuclear reactor control rods, for protecting the reactor and for controlling the movement of the control rods.

FIG. 4 shows the cross section of the core 2 of a pressurized-water nuclear reactor, which comprises four quadrants 2a, 2b, 2c, 2d separated from one another by two vertical planes of symmetry indicated by the lines 16a and 16 in FIG. 4, which are mutually perpendicular and pass through the axis of the core 2.

Eighteen neutron absorber rod clusters of eighteen control rods for controlling the core reactivity are moved inside the fuel assemblies located in the quadrants 2a, 2b and 2c, the fuel assemblies in which the neutron absorber rod clusters are moved being distributed over the area of the quadrants.

Nineteen neutron absorber rod clusters of nineteen control rods are moved, in the fourth quadrant 2d, in fuel assemblies distributed over the cross section of the quadrant 2d.

The nuclear reactor is therefore controlled by means of seventy-three control rod clusters distributed in three subassemblies of eighteen rod clusters and one subassembly of nineteen rod clusters.

Each subassembly of control rods and of neutron absorber rod clusters has its own means for collecting the measurements on the position of the control rods of the subassembly and for processing these measurements in order to protect the nuclear reactor during its operation.

All the means for collecting the position measurements and the means for protecting the core are placed in protection rooms 17 lying around the nuclear reactor vessel containing the core 2.

The protection rooms 17 contain, for each of the control rod subassemblies associated with one quadrant of the core 2, means 18 for collecting the measurements carried out on the eighteen or nineteen control rods of the subassembly.

The means 18 for collecting the measurements of the position of the control rods of a subassembly are called IPB cabinets, these cabinets containing rod position instrumentation (IPB) sensors.

The means for measuring each of the control rods are connected by measurement cables to the corresponding IPB cabinet in which measurement sensors 18a transfer the measurement signals to a data acquisition and processing unit 19, called UATP cabinet, for protecting the nuclear reactor.

Among the signals transmitted to the IPB cabinet are the voltage signals from the primary windings of the position measurement means of each of the tubular enclosures for moving a control rod drive shaft.

The position measurements carried out on the control rods are also used in a room 20 from which the movement of the control rods is controlled, and in which are placed, in particular, nineteen cabinets 21 called EEC1 . . . EEC19 cabinets which contain an electronic device for controlling the movements of the control rods. These devices are units of the system for controlling the movement of the control rods which deliver currents to the actuators of the mechanisms for moving the control rods, according to the orders received by the control units.

Also placed inside the room 20 is a unit for controlling the power generator sets and a unit for controlling the shutdown generator sets and the temperature in the nuclear reactor core. This unit 22 for controlling the movement of the control rod clusters coordinates the operation of the electronic control devices (EECs) 21.

When it is desired to carry out a measurement of the drop time of the control rod clusters, it is necessary, within each of the IPB cabinets 18 of each of the control rod subassemblies, to connect a cable for measuring the voltage at the terminals of a primary winding of a means for measuring the movement of a control rod. It is thus possible to carry out, simultaneously, a measurement of the drop time of four control rods each belonging to one subassembly.

It is therefore necessary to carry out measurement cable connections and the control rod drop test operations nineteen times, the last operation being carried out on a single control rod of the last subassembly located in the quadrant 2d.

As indicated above, this procedure is lengthy and requires a connection to be made before the measurement and then a return of the connections to their initial state in the IPB cabinet.

Furthermore, it is not possible to make the connections and therefore to carry out the tests while the nuclear reactor is operating.

Should a control rod accidentally drop while the nuclear reactor is operating, there is no means for measuring the drop time of the control rod.

Figure 5:
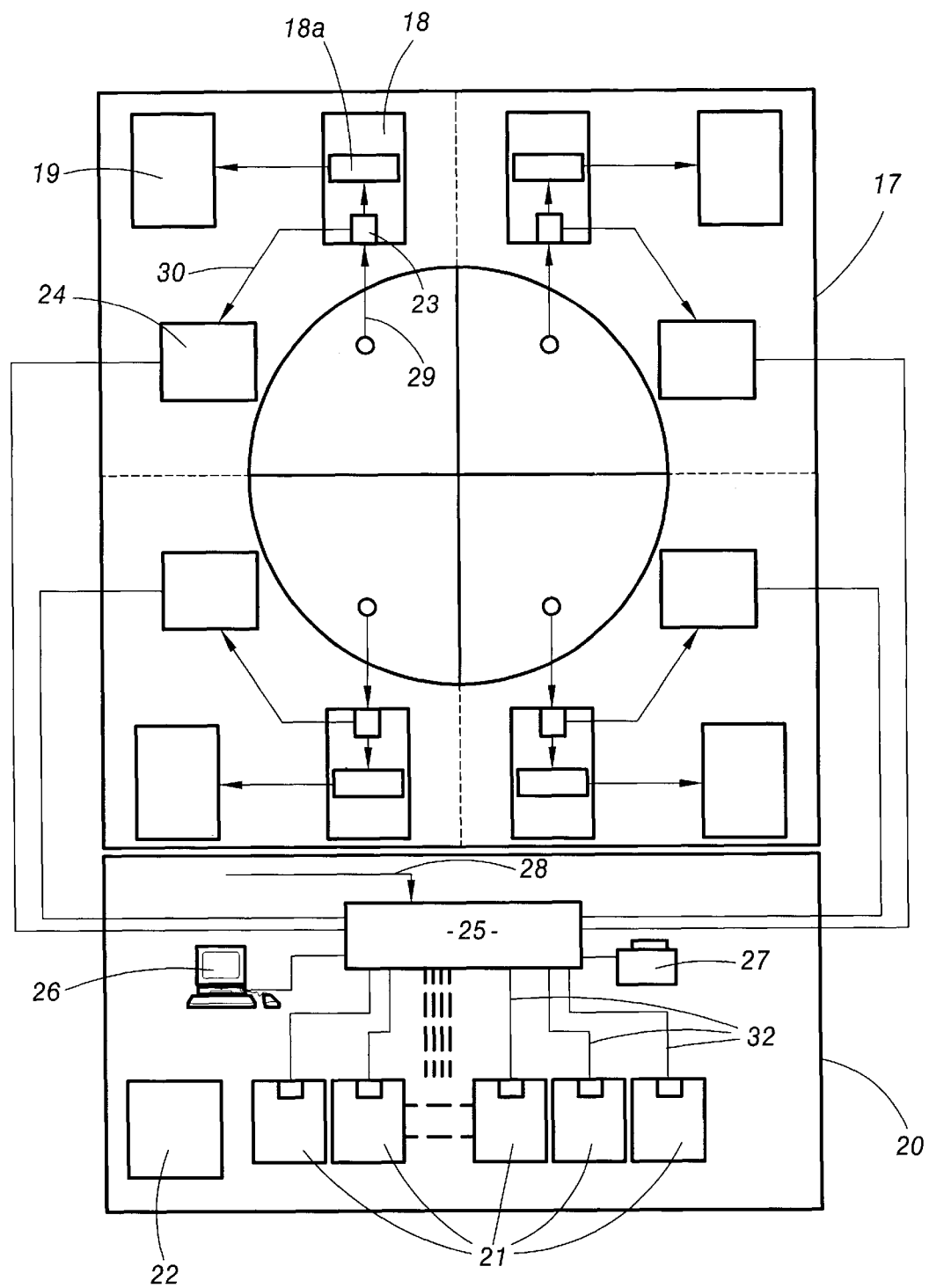
FIG. 5 is a schematic view, similar to the view in FIG. 1, showing a device for measuring the drop times of the control rods according to the invention.

FIG. 5 shows a measurement device according to the invention which makes it possible to overcome the drawbacks of the measurement operations carried out according to the prior art.

The device according to the invention has been shown in FIG. 5 which depicts the protection rooms 17 and the control rooms 20 from which the movement of the control rods is controlled, the corresponding elements in FIGS. 4 and 5 being denoted by the same reference numbers.

The measurement device according to the invention comprises, in each of the IPB cabinets for each of the control rod subassemblies receiving the control rod measurement signals, a system of connection means 23 each produced in the form of an interface box receiving, via measurement cables for each of the control rods of the subassembly, the measurement signals and in particular the voltage signals from the primary windings of the control rod position measurement means.

The interface boxes 23 permanently connected to the measurement cables for the control rods of the subassembly make it possible to extract, without making a connection, the voltage signals from the primary windings of the control rod position measurement means in order to carry out measurements of the drop time of the control rods as a whole.

Each of the interface boxes 23 of an IPB cabinet 18 of a control rod subassembly is connected, via an isolating box 24, to a system 25 for the real-time acquisition of the voltage measurement signals from the primary windings, this acquisition system 25 being placed in the room 20 from which the movement of the control rods is controlled.

In this way, the real-time measurement-signal acquisition system 25 can simultaneously receive the voltage signals from all the primary windings of the means for measuring the movement of all the control rods, for example during a test for measuring the control rod drop time. Only one control rod drop and release operation is thus carried out, it being possible for the voltages at the primary windings to be picked up simultaneously and stored in memory in the acquisition system 25.

Each IPB cabinet 18 therefore has an interface box 23 for each of the pick-up and measurement cables coming from each of the means for measuring the movement of a control rod.

Each interface box 23 is connected to the acquisition system 25 via an isolating box 24.

Figure 6:
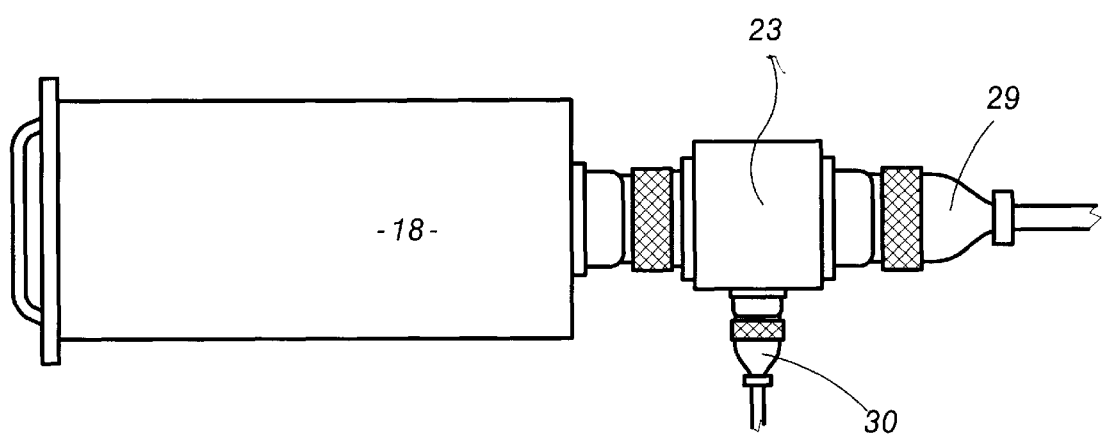
FIG. 6 is a detailed view of the means for connecting a measurement cable of the device according to the invention.

FIG. 6 shows the rack of the IPB cabinet 18 to which each of the measurement cables 29 associated with the means for measuring the movement of a control rod is connected via the interface boxes 23.

A cable 30 can be used to pick up the voltage signals coming from the primary windings of the measurement means and transmit them to the real-time acquisition system via an isolating box 24.

Each of the interface boxes 23 includes an attenuator making it possible to adapt the level of the signal transmitted to the electronics carrying out the DC isolating of the signals in the isolating box 24 and to protect the primary winding circuit from any risk of short circuit.

The DC isolation box 24 contains two isolation cards each having ten channels and withstands an isolation of 500 volts rms, the output voltage being 10 volts.

The isolating boxes 24 associated with each of the control rods subassemblies make it possible to clearly separate the protection function from the control function, thus preventing any electrical interference coming from components which are not classified for nuclear reactor safety. There is no risk of the measurements taken by the interface boxes 23 in the IPB cabinets 18 disturbing the operation of the processing units 19 for protecting the nuclear reactor.

In its entirety, the IPB interface, which incorporates the measurement device according to the invention, comprises in total seventy-three interface boxes equipped with attenuators, eight electronic isolation cards and four isolation boxes.

A second part of the measurement device according to the invention is placed inside the room 20 from which the movement of the control rods is controlled. From this room, or RGL (full-length rod control system) room, the movement of the full length control rods is controlled, that is to say the raising and lowering of the rod clusters from and into the nuclear reactor is controlled.

The measurement device according to the invention includes, inside the RGL room, the real-time measurement-signal acquisition system 25 which is connected, on the one hand, via four isolation boxes 24, to the four IPB cabinets 18 and, on the other hand, inside the RGL room 20, to each of the EEC cabinets, that is to say the cabinets for the electronic devices for controlling the movement of the rod clusters. In addition, the acquisition system 25 receives a signal 28 for automatically shutting down the reactor by dropping the control rods, this signal being taken off a free contact of the nuclear reactor control unit.

A DC isolation of 500 volts rms is achieved by standard modules inserted into a rack of the data acquisition system 25 in order to effectively isolate the acquisition system from the units for controlling the movement of the rod clusters from the RGL room.

All the measurement signals from the primary windings are combined in the real-time acquisition system 25 which delivers, for each of the control rods, at the moment when the control rod drops, a curve giving the voltage induced in the primary winding as a function of time, this curve making it possible to determine the duration of the voltage signal and from it deduce the drop time of the control rod.

The data is processed by a microcomputer 26 which is used to determine the control rod drop times and to store these drop times in its memory.

The input data and the data provided by the microcomputer 26 relating to the drop time can be printed on a printer 27. The microcomputer 26 and the printer 27 therefore constitute means for displaying and printing the results relating to the control rod drop time.

Figure 7:
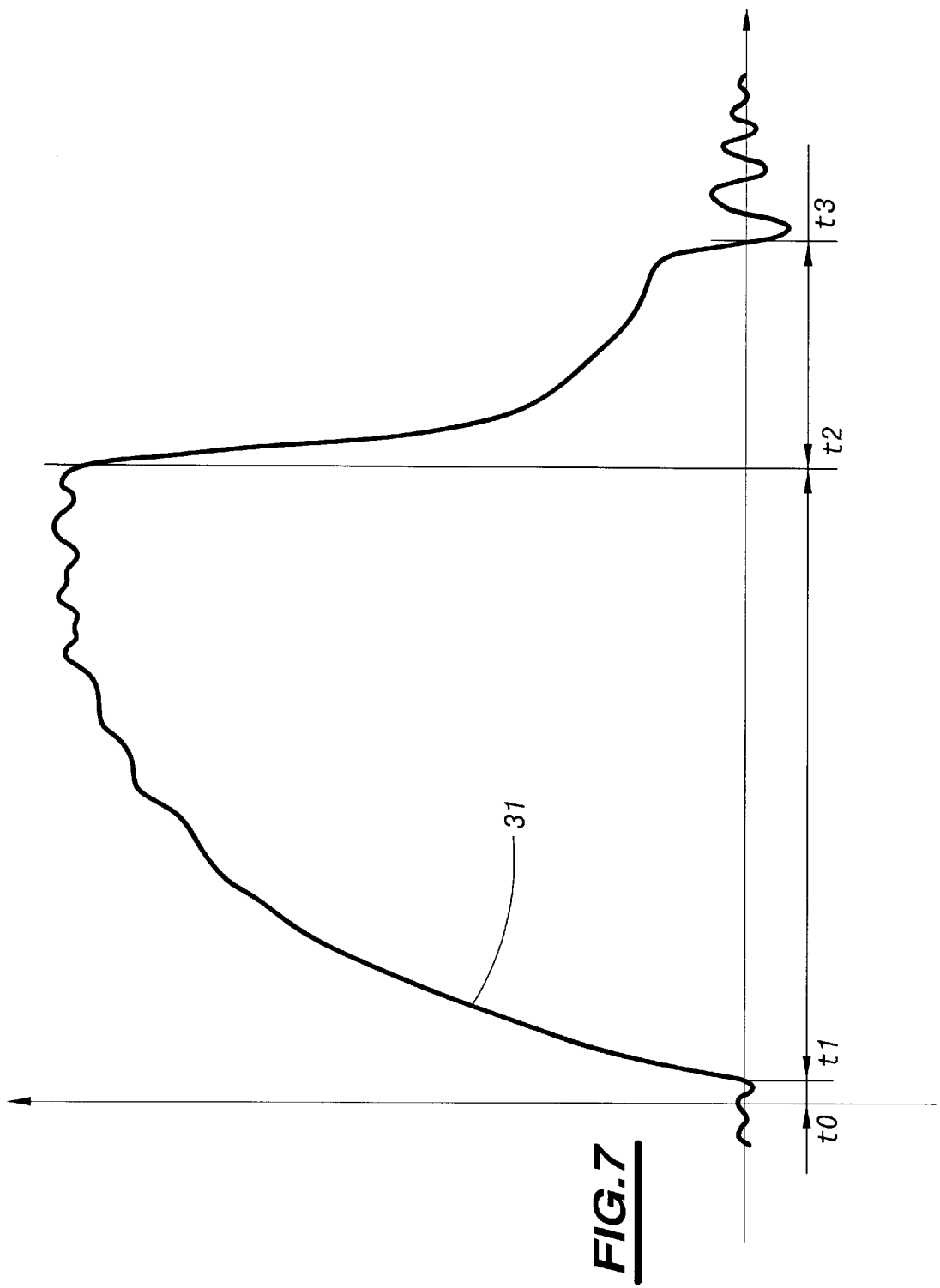
FIG. 7 is a diagram showing the voltage induced in a primary measurement winding of a tubular enclosure for a control rod, as a function of time, during the drop of a control rod.

FIG. 7 shows, in a diagram giving the voltage as a function of time, the curve of the voltage induced in a primary winding of a tubular enclosure for a control rod, during the drop of the control rod.

The movement of the drive shaft inside the tubular enclosure and inside the primary winding produces a dynamic change in the reluctance of the winding and therefore an induced voltage at the terminals of the primary winding.

The signal representative of this induced voltage varies as a function of time during the drop of the control rod, this variation being shown by curve 31 in FIG. 7.

In FIG. 7, the times t0, t1, t2 and t3 are plotted on the x-axis. The time t0 corresponds to the time origin of the drop time measurement. This time t0 can be determined in different ways. Firstly, the time t0 can be determined from the nuclear reactor emergency shutdown signal 28 which is transmitted to the acquisition system 25.

The time t0 can also be determined from the current signals 32 which are transmitted by the cabinets 21 in the RGL room to the acquisition system 25. These signals 32 correspond to the current supplied to the stationary grippers of the mechanisms for moving the control rods, these grippers ensuring retention of the drive shafts and of the control rods. The moment when the current supply to the stationary gripper becomes zero corresponds to the moment that the control rod is released. Finally, the start of the drop of the control rod can equally be determined purely graphically, from the shape of the induced voltage curve 31 as a function of time.

Up to the time t1, that is for a very short period T4 from t0 to t1, the voltage induced in the primary winding remains virtually constant, which corresponds to the inertia of the system at the moment when the control rod is released. After the time t1 and up to the time t2, the induced voltage increases and stabilizes over a period T5 extending from the time t1 to the time t2. This phase in the drop of the control rod corresponds to the acceleration of the drive shaft and its exit from the tubular enclosure and from the primary winding, these two phenomena being counterbalanced in order to stabilize the induced voltage at a high level. Thereafter, from the time t2 to the time t3 during a period T6, the induced voltage decreases and returns to a level approximately equal to the starting level, with a certain amount of instability. The drop is regarded as being complete when the induced voltage returns to the initial level for the first time.

This phase, during which the induced voltage is decreasing, corresponds to the exit of the drive shaft from the tubular enclosure and from the primary winding.

The drop time is determined by adding the times T4, T5 and T6 together.

The primary winding is generally supplied with AC current at a frequency of 50 Hz and at a voltage of 50 to 70 V. The induced voltage is a signal at a very low frequency (~10 Hz) and with an amplitude of a very few volts depending on the initial position of the control rod at the moment of its release.

To obtain the induced voltage curve (like the one shown in FIG. 7), it is necessary to filter the voltage picked up, in order to overcome the problem of the supply voltage.

If the primary winding is not powered, the induced voltage is picked up directly at the terminals of the primary winding.

The device according to the invention allows the control rod drop time to be measured accurately, with a very small number of measurements, for example one or two measurements, it being possible for the signals relating to all of the rods to be recorded in a single operation and then processed after they have been stored.

The method according to the invention has the advantage of avoiding any operation of connecting and disconnecting measurement lines, before and after the drop time measurements.

The device according to the invention also has the advantage of being able to carry out measurements while the nuclear reactor is operating and in the event of the accidental dropping of a control rod, the induced voltage signal then being automatically recorded by the real-time signal acquisition system.

The invention is not limited to the embodiment which has been described.

Thus, the various connections of the measurement device according to the invention to units used for protecting or controlling the nuclear reactor may be different from those described.

The invention applies in the case of any nuclear reactor having control rods consisting of control rod clusters which are moved vertically in the core of a nuclear reactor by means of drive shafts.

What is claimed is:

1. Device for measuring the drop time of a control rod into the core of a nuclear reactor comprising:

a vessel closed in its upper part by a closure head and containing the reactor core including fuel assemblies positioned in vertical adjacent arrangements and having vertical guide tubes for receiving neutron absorbers of a plurality of control rods, each control rod including a neutron absorber rod cluster;

a drive shaft connected at one of its ends to the control rod cluster;

a plurality of tubular enclosures placed vertically above the closure head of the vessel, each tubular enclosure having a mechanism for moving a control rod by means of its vertical drive shaft, in the axial vertical direction of the tubular enclosure and for releasing the drive shaft in order to ensure that it drops into the position of maximum insertion in the nuclear reactor core;

at least one electrical measurement winding surrounding each tubular enclosure, substantially over its entire axial length and connected to a measurement cable for picking up a measurement signal at the terminals of the winding;

the control rods being grouped together in subassemblies and each electrical winding for each of the rods of a subassembly being connected via a measurement cable to a cabinet of rod position instrumentation containing a plurality of control rod position instrumentation sensors;

a real-time measurement-signal acquisition module; and means for processing the measurement signals being connected to the output of the acquisition module for measuring the drop time of the nuclear reactor control rods;

wherein each cabinet of the rod position instrumentation includes, for each measurement cable connected at its input to the winding of a control rod, an interface box connected permanently to an output of the measurement cable and to an input of a transmission cable for continuously transmitting a measurement signal to the real time acquisition module without interruption of supply power to the winding.

2. Device according to claim 1, wherein each interface box comprises an attenuator for attenuating the level of the measurement signal transmitted to the real-time acquisition module.

3. Device according to claim 1, wherein the measurement signal is filtered to overcome the effect on the drop time measurement of a supply voltage of the winding provided through a cabinet of the rod position instrumentation.

4. Device according to claim 1, wherein each of the transmission cables is connected to the real-time acquisition module via an isolation box.

5. Device according to claim 1, comprising four cabinets containing nuclear-reactor control-rod position instrumentation sensors, each rod being associated with one part of the nuclear reactor core having a quadrant-shaped cross section, the nuclear reactor core including four quadrants defined by two mutually perpendicular planes of symmetry passing through the vertical axis of the nuclear reactor core, the electrical measurement windings for each of the control rods in one part of the nuclear reactor core being connected to one of the four cabinets containing control-rod position instrumentation sensors and the interface boxes connected to the measurement cables of the electrical windings for the control rods being placed in the cabinets containing the rod position instrumentation sensors.

6. Device according to claim 5, comprising four DC isolation boxes, the input of each being connected to an output of a respective interface box, thereby transferring the measurement signals from the control rods to the signal acquisition module.

7. Device according to claim 1, wherein each interface box is placed inside a nuclear reactor protection room and the measurement-signal acquisition module and the means for processing the signals are placed in a room from which the movement of the control rods is controlled.

8. Device according to claim 1, wherein the means for processing voltage signals, which are connected to the acquisition module, comprise a microcomputer for calculating the drop time of the control rods.

9. Device according to claim 1, wherein the electrical measurement windings comprise primary windings of transformers that measure the position of the control rod.

* * * * *